United States Patent

Schümann et al.

[11] Patent Number: 6,129,983
[45] Date of Patent: Oct. 10, 2000

[54] SELF-ADHESIVE TAPE

[75] Inventors: Uwe Schümann, Pinnenberg; Kirstin Weiland, Hamburg; Wolfgang Schacht, Neu Wulmstorf, all of Germany

[73] Assignee: Beiersdorf AG, Hamburg, Germany

[21] Appl. No.: 09/124,144

[22] Filed: Jul. 29, 1998

[30] Foreign Application Priority Data

Jul. 31, 1997 [DE] Germany .......................... 197 33 014

[51] Int. Cl.$^7$ .................................. C09J 7/02; B32B 7/12
[52] U.S. Cl. ........................ 428/343; 428/353; 428/354; 427/208; 427/208.4
[58] Field of Search ..................................... 428/343, 353, 428/354; 427/208, 208.4

[56] References Cited

U.S. PATENT DOCUMENTS

| Re. 31,887 | 5/1985 | Hodgson .......................... 428/343 X |
|---|---|---|
| 5,127,974 | 7/1992 | Tomiyama et al. ........................ 156/85 |
| 5,229,207 | 7/1993 | Paguette et al. ..................... 428/343 X |
| 5,384,174 | 1/1995 | Ward et al. .......................... 428/352 X |
| 5,672,402 | 9/1997 | Kreckel et al. ..................... 428/343 X |
| 5,908,693 | 6/1999 | Delgado et al. .......................... 428/343 |

FOREIGN PATENT DOCUMENTS

| 0 601 582 A1 | 6/1994 | European Pat. Off. . | |
| 2579609 | 10/1986 | France ................. | C09J 3/16 |
| 21 05 877 C3 | 8/1972 | Germany . | |
| 19527926A1 | 1/1997 | Germany .......................... | C09J 7/02 |
| 19614620C2 | 10/1997 | Germany .......................... | C09J 7/02 |
| 9516754 | 6/1995 | WIPO ................................. | C09J 7/02 |

OTHER PUBLICATIONS

Jap. Patent Abstract 61–275371 A, Dec. 1986.
Patent Abstracts of Japan, Publication No. 61275371, dated May 12, 1986.

Primary Examiner—Daniel Zirker
Attorney, Agent, or Firm—Norris, McLaughlin & Marcus, P.A.

[57] ABSTRACT

Pressure-sensitive double-sided self-adhesive tape comprising a backing which is coated on both sides with pressure-sensitive adhesive compositions and which is composed a) to a proportion of up to 50% by weight, in particular from 30 to 40% by weight, of a crosslinked, unfoamed polyurethane
   i) formed from hydroxyl-functionalized polybutadiene, polyesterdiol, polyestertriol, polyesterpolyol, polyetherdiol, polyethertriol or polyetherpolyol, polyetherdiamine, polyethertriamine, polyetherpolyamine and monohydric alcohol (monool), monofunctional amine (monoamine), polyethermonool, polyethermonoamine or from products derived from the four last-mentioned groups
   ii) and from diisocyanate or chemically derived isocyanate,
   iii) the polyurethane being free from plasticizer,
b) to a proportion of from 50 to 70% by weight of fillers,
c) and, if desired, further auxiliaries.

11 Claims, No Drawings

SELF-ADHESIVE TAPE

The invention relates to a double-sided self-adhesive tape which on the one hand is able to provide gap-bridging sealing functions and on the other hand achieves the bond strengths typical of commercial high-performance adhesive tapes. The product is suitable for obtaining bonds which are resistant to both low temperatures and heat.

In order to achieve good resistance to peeling and shear forces it is known to use various adhesive tapes.

DE-C 2105877 discloses an adhesive tape consisting of a backing which is coated on at least one side with a microcellular, pressure-sensitive adhesive and whose adhesive layer comprises a nucleating agent, the cells of the adhesive layer being closed and being distributed entirely within the adhesive layer. This adhesive tape has the ability to conform to the irregular surface to which it is applied and hence to lead to a relatively durable bond, while on the other hand it exhibits only a relatively low degree of recovery when compressed to half its original thickness. The voids in the adhesive composition, however, offer entry points for the lateral ingress of solvents and water into the joints, which is highly undesirable in the case, for example, of bonded strips in carmaking. In addition, it is impossible to rule out the complete penetration of solvents or water through the entire adhesive tape.

EP 601 582 A describes an adhesive tape consisting of a foamed elastomer core to which a pressure-sensitive adhesive layer has been applied.

Here, too, the principle of voids gives rise to certain disadvantages in that the adhesive tape core is able to suck up moisture or solvent like a sponge. This may lead to a reduction in the bond strength. In addition, the principle of the foamed elastomer core gives rise within the bonds to recovery forces which may lead to premature failure of the bonds.

A common drawback of the adhesive tapes mentioned is that the ability to absorb the shear forces which act on the bonded join is for numerous applications to ensure a permanent join between the substrate and the article that is to be mounted by means of the adhesive tape. For instance, especially at relatively low temperatures, the use of such adhesive tapes is extremely limited, since at low temperatures the backing becomes brittle and so the adhesive tape is no longer able to maintain the desired bond.

In addition, the adhesive tapes mentioned are unable to seal and bridge gap widths of more than 0.5 cm. Adhesive tapes which are able to do this, such as butyl tapes, attain only very low resistance to shear stresses and tip-shear stresses, especially at elevated temperatures.

Also known is a laminate of a polyurethane and a pressure-sensitive adhesive layer. Such a laminate is disclosed, for example, in WO 86/00536, in the description of a tablet pack or tablet administration form. In that patent, a polyester film which has not undergone any further preparation is provided with a self-adhesive coating which envelops a tablet and is bonded simultaneously with the tablet to the skin of the user.

U.S. Pat. No. 5,127,974 discloses a film for the temporary protection of the printed surfaces of cars, and also proposes, inter alia, the use of polyurethane to produce the backing film. A pressure-sensitive adhesive composition is then applied to the backing film. Following the removal of a layer which protects the adhesive composition, this laminate of film and adhesive composition is applied to the painted surface.

A double-sided self-adhesive tape based on a polyurethane backing as described above and on a double-sidedly laminated pressure-sensitive adhesive layer is not described in the documents mentioned but would, moreover, have the disadvantage of the elastic recovery forces of the backing, which cannot be contained and would therefore lead to a reduction in the bond strength.

The object on which the invention is based is to provide a self-adhesive tape which does not have the disadvantages of the prior art, or at least not to the same extent, and which is nevertheless not restricted in its usefulness like the abovementioned products.

In order to achieve this object the invention proposes a pressure-sensitive self-adhesive tape coated on both sides with adhesive compositions, whose backing is formed by a formulated, crosslinked, unfoamed polyurethane.

Formulation constituents of the backing are a crosslinked, unfoamed polyurethane, fillers and, if desired, further auxiliaries. The proportion of the polyurethane in the backing is up to 50% by weight, preferably from 30 to 40% by weight, and the polyurethane is free from plasticizer. The fillers account for from 50 to 70% by weight of the backing.

The selection of the isocyanate component of the polyurethane depends on the specific properties that are to be established in the backing. Suitable examples are tolylene diisocyanate, diphenylmethane 4,4'-diisocyanate, dicyclohexylmethane 4,4'-diisocyanate, hexamethylene diisocyanate, isophorone diisocyanate, mixtures of these isocyanates, or isocyanates derived therefrom by chemical means, for example dimerized or trimerized types. The selection of the component which reacts with the isocyanate depends likewise on the properties that are to be established in the backing as a function of the desired profile of requirements. Suitable examples are all polyesterdiols, -triols and -polyols, polyetherdiols, -triols and -polyols, polyetherdiamines, -triamines and -polyamines, hydroxyl-functionalized polybutadiene, and all monohydric alcohols (monools), monofunctional amines (monoamines), polyethermonools, polyethermonoamines or products derived from the four last-mentioned groups.

It has been found advantageous if the hydroxyl-functionalized polybutadienes, the polyesterdiols, the polyestertriols, the polyesterpolyols, the polyetherdiols, the polyethertriols, the polyetherpolyols, the polyetherdiamines, the polyethertriamines or the polyetherpolyamines have a molecular weight $M_w \geq 1000$ g/mol.

In addition to the above-listed isocyanate components and the components which react therewith, however, it is also possible to use other starting materials to form the polyurethane, without departing from the concept of the invention.

In order to accelerate the reaction between the isocyanate component and the component which reacts with the isocyanate it is possible to employ all catalysts known to the skilled worker, such as tertiary amines or organotin compounds, for example.

Polyurethanes as described above are state of the art in their preparation and are described, for example, in "Ullmann's Encyclopedia of Industrial Chemistry, Vol. A21: Polyurethanes".

The formulation of polyurethane compositions is likewise state of the art and is employed in particular in the preparation of sealing compounds (cf. "Ullmann's Encyclopedia of Industrial Chemistry, Vol. A 23: Sealing Materials").

In a particularly preferred embodiment of the self-adhesive tape an NCO/OH ratio of from 1.0 to 1.3, preferably from 1.0 to 1.1, is established in order to form the polyurethane.

The preferred proportion of monool OH as a proportion of the total OH, i.e. the preferred chain-terminating proportion, is between 5 and 40%, in particular between 10 and 30%.

Both reinforcing fillers such as carbon black, for example, and non-reinforcing fillers such as chalk or barium sulphate, for example, can be employed. Further examples are talc, mica, pyrogenic silica, silicates, zinc oxide, solid glass microbeads, hollow glass microbeads and/or polymer microbeads of all kinds. Mixtures of these materials can also be employed.

In order to increase the stability of the adhesive tape to ageing it can be blended with customary anti-ageing agents, which depending on the particular application may come from the class of the discolouring or non-discolouring anti-ageing agents, these agents being blended in the range between 0 and 5% by weight, and known light stabilizers in the range between 0 and 5% by weight, or ozone protectants in the range between 0 and 5% by weight. In order to achieve freedom from bubbles it is also possible to admix siccatives, such as calcium oxide or molecular sieve zeolites, for example, to the formulation, in particular in the range between 0 and 10% by weight.

Depending on the intended use of the self-adhesive tape, all of the auxiliaries referred to can be employed either alone or in any desired combination with one another to prepare the polyurethane composition in order to obtain optimum tailoring to the utility. By using these additives it is also possible without problems to obtain the black coloration which is required, in particular, by the motor vehicle industry.

The backing mixture is preferably prepared in a planetary mixer or dissolver. In order to obtain freedom from bubbles mixing takes place under vacuum operation. The viscosity of the mixture is adjusted such that it is between $10^{-1}$ and $10^3$ Pa*s at room temperature. Solvent-free processing is preferred.

The mixture can subsequently be applied on customary coating machines in any desired thickness between 0.1 and 50 mm, preferably between 0.4 and 20 mm.

This is followed by chemical crosslinking in a drying tunnel, preferably at temperatures from room temperature to 120° C., depending on the chosen polyurethane formulation and on the amount of catalyst.

The coating weight of the adhesive composition can likewise be selected arbitrarily, depending on the intended application, within the range from 10 to 250 g/m², preferably from 40 to 150 g/m².

Adhesive compositions which can be used are rubber- or acrylate-based adhesive compositions which have generally been known to date.

In order to increase the anchorage of the adhesive composition on the backing it is possible to employ known adhesion promoters or additional layers of coating material. In this case the coating material is preferably from the group of the polyamide, epoxy, phenolic, urea-formaldehyde, melamine-formaldehyde and polyurethane resins.

Alternatively, a corona pretreatment can be performed. In order to obtain particularly strong anchorages, a combination of the techniques indicated is also possible.

The adhesive composition can be applied directly, by the indirect transfer technique or by coextrusion with the backing, from a solution, dispersion or melt. A particularly preferred form of application is the "inverse" application technique. In this technique the adhesive composition, having been applied to release paper or release film, dried and crosslinked, is introduced and coated with the as yet unhardened, pastelike or liquid polyurethane composition in the desired thickness, with the aid of the two-component mixing technology. Prior to the curing or crosslinking of the polyurethane composition, a second adhesive composition, which has likewise already been applied, dried and crosslinked and is on release paper or release film, is laminated against the applied polyurethane composition. Subsequently, the polyurethane composition is cured or crosslinked by passing it through the drying tunnel at a temperature between room temperature and 120° C., depending on the chosen polyurethane formulation and on the amount of catalyst.

A self-adhesive tape as described above, consisting essentially of a laminate of a polyurethane composition that has been formulated in accordance with the invention and of a pressure-sensitive adhesive layer, and characterized by a three-layer structure comprising adhesive layer/formulated polyurethane composition/adhesive layer, has not been described beforehand in the prior art.

The formulation with fillers leads to the outstanding product properties described above. The fillers take from the polyurethane backing part of its elastic recovery forces and thereby contribute to the long-term strength of the bonds.

The self-adhesive tape exhibits outstanding properties, which could not have been foreseen as such even by the skilled worker. Owing to the high flexibility of the backing, the adhesive tape conforms very well to an uneven substrate if it is pressed onto this substrate using a certain pressure. This produces a highly durable bond between adhesive tape and substrate, which does not fail even when the self-adhesive tape is exposed to high shear forces. Owing to the absence of laterally open voids in the backing, in addition, the possible penetration of solvents or water into the adhesive tape, with all of its known disadvantages, is prevented. Since the adhesive tape of the invention can be produced in thickness of 2 cm or more, it can also be employed as a self-adhesive, gap-bridging sealing tape.

Owing to the very low glass point of the adhesive tape, low-temperature applications down to −40° C. are possible, since the embrittlement otherwise observed with known adhesive tapes does not occur, so that even at these extreme temperatures the adhesive tape is assured of optimum adhesion.

The good thermal and ageing stability of the adhesive tape, brought about by the consistency of the unfoamed backing, which prevents the penetration of moisture and atmospheric oxygen, also enables the tape to be employed at relatively high temperatures from 70 to 100° C.

Low-temperature and heat resistance properties are called for, for example, in carmaking for the bonding of trim strips or mirrors, because the vehicles are in some cases driven in very cold zones or very hot regions of the earth with a high level of solar irradiation.

The invention is used not only in the automotive industry but also in the furniture and construction industry, where again mirrors, strips or covers need to be permanently anchored to the substrate.

Owing to the outstanding properties of the product, however, the use of the invention is not restricted to the examples given. Rather, the adhesive tape can be used as an assembly material in numerous sectors of industry whenever the task at hand is to create a secure bond between two parts of widely different materials on a relatively uneven surface.

The intention of the text below is to illustrate the invention with reference to exemplary embodiments, without thereby wishing to restrict the invention unnecessarily.

EXAMPLES

Table 1 lists the materials used to produce the backing, in each case with their commercial name and manufacturer.

The chemicals specified are all freely available commercially. Depending on the intended application of the self-adhesive tape, the starting materials are in each case employed in different proportions.

TABLE 1

Materials used to produce the backing, with commercial names and manufacturers

| Commercial name | Chemical basis | Manufacturer/ supplier |
|---|---|---|
| Arcol 1010 ® | polyether-diol | ARCO |
| Arcol 1042 ® | polyether-triol | ARCO |
| Baycoll BT 5035 ® | polyether-triol | Bayer |
| Poly bd R45HT ® | pydroxyl-terminated polybutadiene | Elf Atochem |
| Lutensol AO7 ® | ethoxylated $C_{13}C_{15}$ oxo alcohol | BASF |
| 1-Dodecanol | 1-dodecanol | Aldrich |
| Omyacarb 4 BG ® | chalk | OMYA |
| Barytmehl N ® | barium sulphate | Alberti |
| Talkum Prever ® | talc | Luzenac |
| Zinkoxid Harzsiegel GR ® | zinc oxide | Heubach |
| Dualite M 6001 AE ® | coated polymer beads | OMYA |
| Reflexperlen 50 μ ® | solid glass beads | Lindner |
| Sphericel 110 P8 ® | hollow glass beads | Potters-Ballotini |
| Weißfeinkalk ® | calcium oxide | RWK |
| Aerosil R202 ® | hydrophobicized pyrogenic silica | Degussa |
| Printex 30 ® | carbon black | Degussa |
| Desmodur CD ® | modified diphenylmethane 4,4'-diisocyanate | Bayer |
| Vestanat IPDI ® | isophorone diisocyanate | Hüls |

The following text gives 11 formulations for the production of backings according to the invention, in each case in the form of a table. The preparation of the materials used takes place in each case by the method described subsequently.

Example 1

| | |
|---|---|
| Baycoll BT 5035 | 40.0 kg |
| Lutensol AO7 | 3.2 kg |
| Omyacarb 4BG | 47.0 kg |
| Weißfeinkalk | 3.0 kg |
| Aerosil R202 | 2.0 kg |
| Desmodur CD | 4.7 kg |
| DBTL | 0.1 kg |

Example 2

| | |
|---|---|
| Baycoll BT 5035 | 40.0 kg |
| 1-Dodecanol | 1.2 kg |
| Omyacarb 4BG | 49.0 kg |
| Weißfeinkalk | 3.0 kg |
| Aerosil R202 | 2.0 kg |
| Desmodur CD | 4.7 kg |
| DBTL | 0.1 kg |

Example 3

| | |
|---|---|
| Arcol 1042 | 42.0 kg |
| Lutensol AO7 | 1.5 kg |
| Omyacarb 4BG | 48.8 kg |
| Weißfeinkalk | 3.0 kg |
| Printex 30 | 1.0 kg |
| Vestanat IPDI | 3.4 kg |
| DBTL | 0.3 kg |

Example 4

| | |
|---|---|
| Arcol 1042 | 42.0 kg |
| Omyacarb 4BG | 51.3 kg |
| Weißfeinkalk | 3.0 kg |
| Printex 30 | 1.0 kg |
| Vestanat IPDI | 2.4 kg |
| DBTL | 0.3 kg |

Example 5

| | |
|---|---|
| Poly bd R 45 HT | 17.2 kg |
| Arcol 1010 | 17.6 kg |
| Lutensol AO 7 | 3.1 kg |
| Omyacarb 4BG | 49.8 kg |
| Weißfeinkalk | 3.0 kg |
| Printex 30 | 1.0 kg |
| Desmodur CD | 8.2 kg |
| DBTL | 0.1 kg |

Example 6

| | |
|---|---|
| Poly bd R 45 HT | 17.2 kg |
| Arcol 1010 | 17.6 kg |
| Lutensol AO 7 | 3.1 kg |
| Omyacarb 4BG | 19.8 kg |
| Barytmehl N | 30.0 kg |
| Weißfeinkalk | 3.0 kg |
| Printex 30 | 1.0 kg |
| Desmodur CD | 8.2 kg |
| DBTL | 0.1 kg |

Example 7

| | |
|---|---|
| Poly bd R 45 HT | 17.2 kg |
| Arcol 1010 | 17.6 kg |
| Lutensol AO 7 | 3.1 kg |
| Omyacarb 4BG | 34.8 kg |
| Talkum Prever | 15.0 kg |
| Weißfeinkalk | 3.0 kg |
| Printex 30 | 1.0 kg |
| Desmodur CD | 8.2 kg |
| DBTL | 0.1 kg |

Example 8

| | |
|---|---|
| Poly bd R 45 HT | 17.2 kg |
| Arcol 1010 | 17.6 kg |
| Lutensol AO 7 | 3.1 kg |
| Omyacarb 4BG | 39.8 kg |
| Zinkoxid Harzs. GR | 10.0 kg |
| Weißfeinkalk | 3.0 kg |
| Printex 30 | 1.0 kg |
| Desmodur CD | 8.2 kg |
| DBTL | 0.1 kg |

Example 9

| | |
|---|---|
| Poly bd R 45 HT | 17.2 kg |
| Arcol 1010 | 17.6 kg |
| Lutensol AO 7 | 3.1 kg |
| Omyacarb 4BG | 39.8 kg |
| Dualite M6001 AE | 10.0 kg |
| Weißfeinkalk | 3.0 kg |
| Printex 30 | 1.0 kg |
| Desmodur CD | 8.2 kg |
| DBTL | 0.1 kg |

Example 10

| | |
|---|---|
| Poly bd R 45 HT | 17.2 kg |
| Arcol 1010 | 17.6 kg |
| Lutensol AO 7 | 3.1 kg |
| Omyacarb 4BG | 39.8 kg |
| Reflexperlen 50 $\mu$ | 10.0 kg |
| Weißfeinkalk | 3.0 kg |
| Printex 30 | 1.0 kg |
| Desmodur CD | 8.2 kg |
| DBTL | 0.1 kg |

Example 11

| | |
|---|---|
| Poly bd R 45 HT | 17.2 kg |
| Arcol 1010 | 17.6 kg |
| Lutensol AO 7 | 3.1 kg |
| Omyacarb 4BG | 39.8 kg |
| Sphericel 110 P8 | 10.0 kg |
| Weißfeinkalk | 3.0 kg |
| Printex 30 | 1.0 kg |
| Desmodur CD | 8.2 kg |
| DBTL | 0.1 kg |

The components in the examples given are—with the exception of the isocyanate, which is not added until directly prior to coating with the aid of customary commercial 2-component mixing technology—mixed with one another in a customary commercial planetary mixer or dissolver for two hours. In order obtain a bubble-free product, the mixture is degassed for the last 10 minutes of the mixing operation by applying a reduced pressure of less than 15 torr. The result in each case is a pseudoplastic paste which can be processed further at room temperature and has a viscosity in the range from 1 to 300 Pa*s.

Following the addition of the isocyanate, the pastes are coated in a customary commercial coating unit onto customary commercial paper which has been siliconized on both sides to give a 1 mm thick web, and in the subsequent passage through a drying tunnel are crosslinked at a temperature from room temperature to 120° C. with a residence time of from 10 to 30 minutes to form an elastomer. Following their curing and subsequent storage for one week at room temperature the backings have a Shore A hardness of from 10 to 60, a glass transition temperature in the range from −60 to −30° C. and a tensile strength of greater than 1 N/mm$^2$ with an elongation at break of less than 500%.

The material is subsequently coated in two steps on both sides with 50 g/m$^2$ per side of the polyacrylate composition Durotac 280–1753 from National Starch. Coating with the solvent composition takes place directly onto the backing following an in-line corona treatment. The coating is dried at 100° C. and crosslinked. The double-sided adhesive tape thus obtained is covered on one side with release paper.

In a particularly preferred production process, the polyacrylate composition is first applied to release paper or release film and then dried at 100° C. and crosslinked. Coating with the polyurethane mixture takes place directly onto the applied polyacrylate composition. Prior to the curing or crosslinking of the polyurethane composition a second polyacrylate composition, which has likewise already been applied, dried and crosslinked and is on release paper or release film, is laminated to the polyurethane composition. The polyurethane composition is subsequently cured and crosslinked in the course of passage through a drying tunnel at a temperature between room temperature and 120° C., depending on the chosen polyurethane formulation and on the amount of catalyst.

The double-sided adhesive tape is notable for high bond strengths coupled with high shear strength, and the bonds produced therewith possess excellent low-temperature impact strength. The material provides a good seal against moisture.

What is claimed is:

1. Pressure-sensitive double-sided self-adhesive tape comprising a backing which is coated on both sides with a pressure-sensitive adhesive composition, the backing material of which comprises
   a) up to 50% by weight of a crosslinked, unfoamed polyurethane which is
      i) formed by the reaction of a member of the group consisting of hydroxyl-functionalized polybutadiene, polyesterdiol, polyestertriol, polyesterpolyol, polyetherdiol, polyethertriol, polyetherpolyol, polyetherdiamine, polyethertriamine, polyetherpolyamine, monohydric alcohol (monool), monofunctional amine (monoamine), polyethermonool, polyethermonoamine and products derived from the four last-mentioned group, with
      ii) a diisocyanate or a chemically derived isocyanate,
      iii) the polyurethane being free from plasticizer,
   b) from 50 to 70% by weight of fillers,
   c) and, optionally further auxiliaries.

2. Pressure-sensitive double-sided self-adhesive tape according to claim 1, wherein an NCO/OH ratio of from 1.0 to 1.3 is established in forming the polyurethane.

3. Pressure-sensitive double-sided self-adhesive tape according to claim 1, wherein the amounts of the reactants are determined to provide that the proportion of OH, amine or both originating from the monool, monoamine, polyethermonool or polyethermonoamine is between 5 and 40% of the total amount of OH, amine or both provided.

4. Pressure-sensitive double-sided self-adhesive tape according to claim 1, wherein the hydroxyl-functionalized polybutadienes, the polyesterdiols, the polyestertriols, the polyesterpolyols, the polyetherdiols, the polyethertriols, the polyetherpolyols, the polyetherdiamines, the polyethertriamines or the polyetherpolyamines have a molecular weight $M_w \geq 1000$ g/mol.

5. Pressure-sensitive double-sided self-adhesive tape according to claim 1, wherein the backing further comprises a filler selected from the group consisting of carbon black, chalk, barium sulphate, talc, mica, pyrogenic silica, silicates, zinc oxide, solid glass microbeads, hollow glass microbeads and polymer microbeads.

6. Pressure-sensitive double-sided self-adhesive tape according to claim 1, wherein the backing further comprises one or more auxiliaries selected from the group consisting of discoloring or nondiscoloring anti-ageing agents in the amount of from 0 to 5% by weight, light stabilizers in the amount of from 0 to 5% by weight, ozone protectants in the amount of from 0 to 5% by weight, and siccatives in the amount of from 0 to 10% by weight.

7. Pressure-sensitive double-sided self-adhesive tape according to claim 1, wherein the backing has a thickness of from 0.1 to 50 mm.

8. Pressure-sensitive double-sided self-adhesive tape according to claim 1, wherein a layer of a coating material selected from the group consisting of polyamide, epoxy, phenolic, urea-formaldehyde, melamine-formaldehyde and polyurethane resins is applied between backing and adhesive coatings.

9. Pressure-sensitive double-sided self-adhesive tape according to claim 1, wherein the adhesive composition is present on the backing at a basis weight of from 10 to 250 g/m$^2$.

10. Process for preparing a pressure-sensitive double-sided adhesive tape according to claim 1, where a) the adhesive composition is applied to a release paper or a release film, dried and crosslinked, b) unhardened polyurethane composition is applied to the adhesive composition by two-component mixing, c) a second adhesive composition is applied to a release paper or a release film, dried, crosslinked, and laminated to the polyurethane composition, and d) the polyurethane composition is cured or crosslinked at a temperature between 20° C. and 120° C.

11. A method for sealing gaps, which comprises applying an adhesive tape according to claim 1 to said gaps.

* * * * *